(12) United States Patent
Meritt

(10) Patent No.: US 8,601,707 B2
(45) Date of Patent: Dec. 10, 2013

(54) COOKING TIME MEASURING SCALE

(75) Inventor: Ron Meritt, Arroyo Grande, CA (US)

(73) Assignee: East 2 West LLC, Los Angeles, CA (US)

( * ) Notice: Subject to any disclaimer, the term of this patent is extended or adjusted under 35 U.S.C. 154(b) by 173 days.

(21) Appl. No.: 13/334,064

(22) Filed: Dec. 22, 2011

(65) Prior Publication Data

US 2013/0160697 A1    Jun. 27, 2013

(51) Int. Cl.
*G01B 3/10*    (2006.01)

(52) U.S. Cl.
USPC .............................. 33/679.1; 33/494; 33/555.4

(58) Field of Classification Search
USPC ........... 33/483, 485, 494, 555.1, 555.4, 679.1
See application file for complete search history.

(56) References Cited

U.S. PATENT DOCUMENTS

| | | | | |
|---|---|---|---|---|
| 696,834 | A | * | 4/1902 | Mitchell ........................ 33/501 |
| 2,262,664 | A | | 11/1941 | Bresson |
| 2,503,398 | A | * | 4/1950 | Lindsey ......................... 33/494 |
| 2,720,707 | A | | 10/1955 | Bickley |
| 3,918,166 | A | | 11/1975 | Mason |
| 4,214,369 | A | * | 7/1980 | Wasik et al. .................... 33/759 |
| D281,301 | S | | 11/1985 | Spolar |
| 5,613,302 | A | * | 3/1997 | Berman et al. ............... 33/555.4 |
| 8,256,130 | B2 | * | 9/2012 | Jantz ............................ 33/679.1 |
| 2002/0184779 | A1 | * | 12/2002 | Bohnengel .................. 33/555.4 |
| 2010/0263221 | A1 | * | 10/2010 | Jantz ............................ 33/679.1 |

\* cited by examiner

*Primary Examiner* — G. Bradley Bennett
(74) *Attorney, Agent, or Firm* — CKC & Partners Co., Ltd.

(57) ABSTRACT

A cooking time measuring scale includes a bendable ruler with cooking times marked at regular intervals. A cooking time pointer is located at a first end portion of the bendable ruler. When the bendable ruler is wrapped around a vegetable body or a fruit body with the cooking time pointer aligned with the cooking times, an ideal cooking time is measured by using the cooking time pointer to indicate a corresponding cooking time.

20 Claims, 2 Drawing Sheets

COOKING TIME MEASURING SCALE

BACKGROUND

1. Field of Invention

The present invention relates to a cooking time measuring scale. More particularly, the present invention relates to a cooking time measuring scale for vegetables or fruits.

2. Description of Related Art

The Artichoke is one of the most popular cuisines in several countries, e.g., Italy, Spain, or countries in mainland Africa. It has a very distinct flavor that you cannot find in certain parts of the world, including the flamboyant part of Asia where various spices, herbs and flavorings naturally occur.

There are several different ways to cook an artichoke. Microwaving an Artichoke is the fastest way, but steaming an artichoke is an ideal cooking method which maintains the high-nutrient content for which the Artichoke is known. No matter which cooking method is used, a question which is always asked before actually cooking an Artichoke is "how much cooking time is required for cooking the artichoke?" Different sizes of artichokes require different periods of cooking times. A user may guess at cooking times, but there is a risk that he or she may waste several artichokes before obtaining an ideal cooking time.

SUMMARY

In one aspect of the present invention, a cooking time measuring scale includes a bendable ruler on which cooking times are marked at regular intervals. A cooking time pointer is located at a first end portion of the bendable ruler. When the bendable ruler is wrapped around a vegetable body or a fruit body with the cooking time pointer aligned with the cooking times, an ideal cooking time is measured by using the cooking time pointer to indicate a corresponding cooking time.

In another embodiment disclosed herein, the cooking times are marked at intervals of 1 centimeter.

In another embodiment disclosed herein, the cooking times are marked at intervals of 1 inch or half inch.

In another embodiment disclosed herein, the cooking times includes steaming times, boiling times, microwaving times or baking times.

In another embodiment disclosed herein, the first end portion of the bendable ruler includes an opening through which an opposite second end portion of the bendable ruler is inserted when the bendable ruler is wrapped around the vegetable body or the fruit body.

In another embodiment disclosed herein, the first end portion of the bendable ruler is wider than the remaining portions of the bendable ruler.

In another aspect of the present invention, an artichoke cooking time measuring scale includes a bendable ruler with steam or boil cooking times in minutes marked at regular intervals. A cooking time pointer is located at a first end portion of the bendable ruler. When the bendable ruler is wrapped around an artichoke body with the cooking time pointer aligned with the steam or boil cooking times, an ideal cooking time is measured by using the cooking time pointer to indicate a corresponding steam or boil cooking time.

In another embodiment disclosed herein, a shortest steam or boil cooking time is 12.5 minutes and marked at about 4.5 inches away from the cooking time pointer.

In another embodiment disclosed herein, the longest steam or boil cooking time is 52 minutes and marked at about 20.5 inches away from the cooking time pointer.

In another embodiment disclosed herein, the steam or boil cooking times are marked from the shortest cooking time to the longest cooking time at intervals of 1 centimeter.

In another embodiment disclosed herein, the first end portion of the bendable ruler includes an opening through which an opposite second end portion of the bendable ruler is inserted when the bendable ruler is wrapped around the artichoke body.

In another embodiment disclosed herein, the first end portion of the bendable ruler is wider than the remaining portions of the bendable ruler.

In another aspect of the present invention, an artichoke cooking time measuring scale includes a bendable ruler with microwave cooking times in minutes marked at regular intervals. A cooking time pointer is located at a first end portion of the bendable ruler. When the bendable ruler is wrapped around an artichoke body with the cooking time pointer aligned with the microwave cooking times, an ideal cooking time is measured by using the cooking time pointer to indicate a corresponding microwave cooking time.

In another embodiment disclosed herein, the shortest microwave cooking time is 3 minutes and marked at about 4.5 inches away from the cooking time pointer.

In another embodiment disclosed herein, the longest microwave cooking time is 15 minutes and marked at about 20.5 inches away from the cooking time pointer.

In another embodiment disclosed herein, the microwave cooking times are marked from the shortest cooking time to the longest cooking time at intervals of 1 inch or half inch.

In another embodiment disclosed herein, the first end portion of the bendable ruler includes an opening through which an opposite second end portion of the bendable ruler is inserted when the bendable ruler is wrapped around the artichoke body.

In another embodiment disclosed herein, the first end portion of the bendable ruler is wider than the remaining portions of the bendable ruler.

In another embodiment disclosed herein, the bendable ruler has a first edge marked with microwave cooking times at regular intervals and an opposite second edge marked with steam or boil cooking times at regular intervals.

Thus, the cooking times measuring scale for artichokes or other vegetables or fruits can enable a user to properly cook an artichoke, vegetable or fruit. The user will never have to guess at cooking times again. The user just needs to wrap a handy cooking time measuring scale around a corresponding vegetable or fruit body to reveal the ideal cooking time. This handy cooking time measuring scale addresses one of the long felt but unsolved needs in cooking vegetables or fruits.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
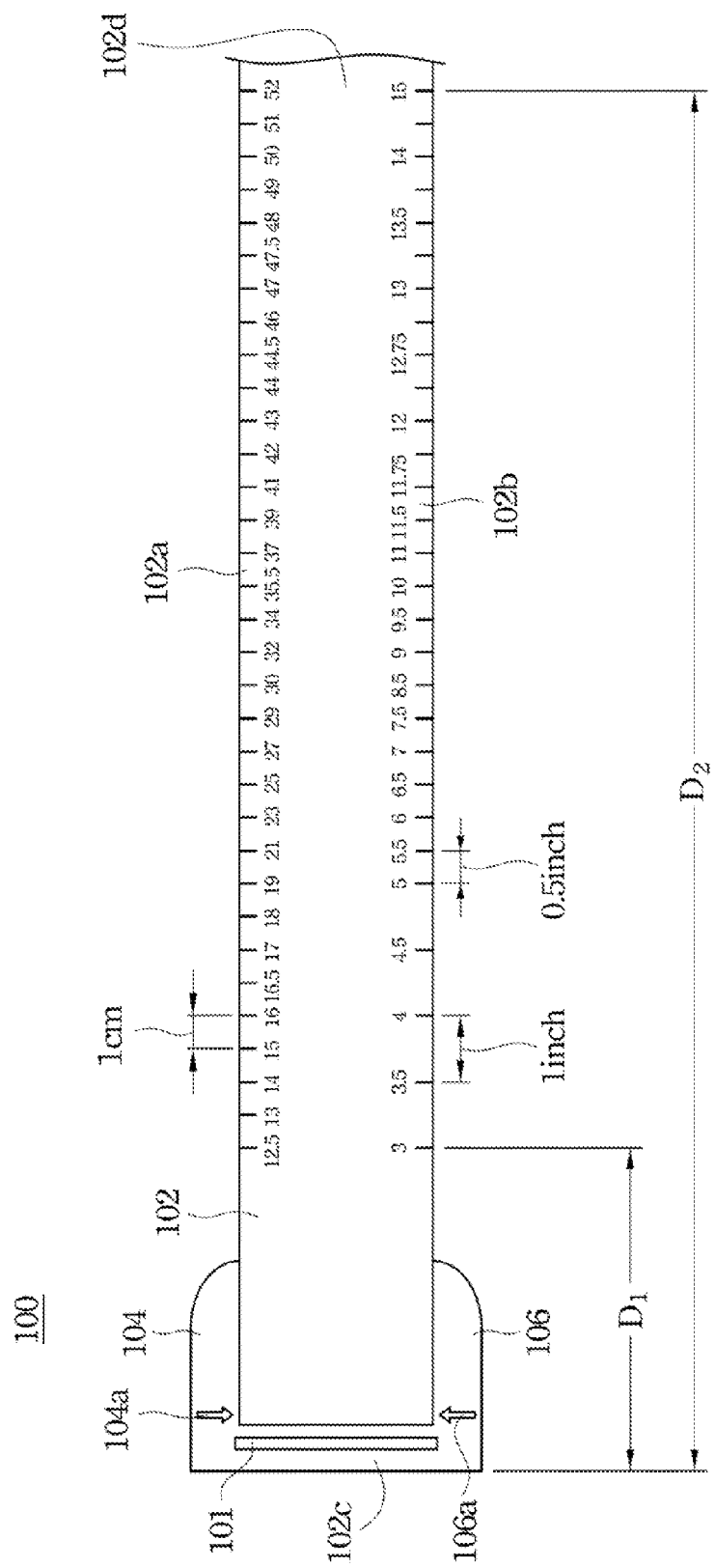
FIG. 1 illustrates an artichoke cooking time measuring scale according to an embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
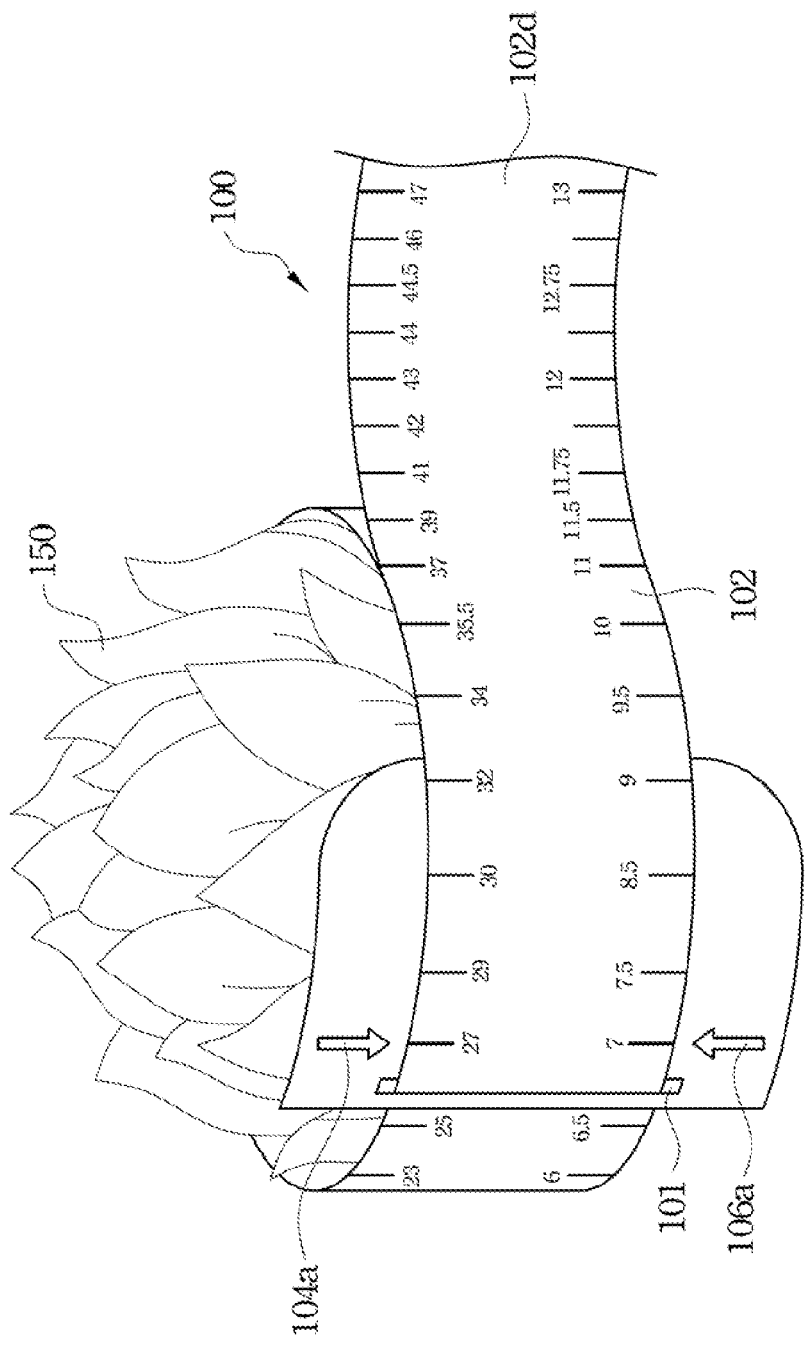
FIG. 2 illustrates a method for using the artichoke cooking time measuring scale to obtain an ideal cooking time for an artichoke.

FIG. 1 illustrates an artichoke cooking time measuring scale 100 according to an embodiment of this invention. FIG. 2 illustrates a method for using the artichoke cooking time measuring scale 100 to obtain an ideal cooking time for an artichoke.

The artichoke cooking time measuring scale 100 includes an elongated bendable ruler 102. The ruler 102 can be made from papers, plastic materials, cloth or other bendable materials. The ruler 102 is marked with cooking times shown thereon. In this embodiment, the ruler 102 is marked with cooking times in minutes, i.e., "12.5" represents "12.5 minutes". The ruler 102 can be marked with cooking times on one single edge, e.g., on an edge 102a or on an edge 102b. Alternatively, the ruler 102 can be marked with two types of cooking times on two opposite edges (102a, 102b) as illustrated in FIG. 1. In this embodiment, the cooking times marked on the edge 102a are steam or boil cooking times while the cooking times marked on the edge 102b are microwave cooking times.

The ruler 102 has a cooking time pointer (104a, 106a) on its end portion 102c. When the bendable ruler 102 is wrapped around an artichoke body 150 with the cooking time pointer (104a or 106a) aligned with the cooking times, an ideal cooking time is measured by using the cooking time pointer (104a or 106a) to indicate a corresponding cooking time. For example, the cooking time pointer 104a indicates 27 minutes while the cooking time pointer 106a indicates 7 minutes as illustrated in FIG. 2. In this embodiment, the cooking time pointer (104a or 106a) is an arrow, but it can be any type of mark or device, which can properly indicate a cooking time marked on the ruler.

A shortest cooking time is marked at a distance $D_1$ away from the cooking time pointer (104a or 106a). The distance $D_1$ and the shortest cooking time are decided by measuring a widest part (or a largest circumference) and a corresponding cooking time of a very small artichoke. In the embodiment of steaming or boiling an artichoke, the shortest steam or boil cooking time is 12.5 minutes and marked at about 4.5 inches far from the cooking time pointer 104a. The cooking time is measured based upon the cooking method of filling a pot with approximately 3 inches of water and placing the artichokes upright in the pot. In the embodiment of microwaving an artichoke, the shortest steam or boil cooking time is 3 minutes and marked at about 4.5 inches away from the cooking time pointer 106a. The cooking time is measured based upon the cooking method of placing the artichokes in a microwave-safe covered bowl with ¼ cup of water for each artichoke and cooking for the specified time at the highest power.

A longest cooking time is marked at a distance $D_2$ away from the cooking time pointer (104a or 106a). The distance $D_2$ and the longest cooking time are decided by measuring a widest part (or a largest circumference) and a corresponding cooking time of a very large artichoke. In the embodiment of steaming or boiling an artichoke, the longest cooking time is 52 minutes and marked at about 20.5 inches away from the cooking time pointer 104a. The cooking time is measured based upon the cooking method of filling a pot with approximately 3 inches of water and placing the artichokes upright in the pot. In the embodiment of microwaving an artichoke, the longest cooking time is 15 minutes and marked at about 20.5 inches away from the cooking time pointer 106a. The cooking time is measured based upon the cooking method of placing the artichokes in a microwave-safe covered bowl with ¼ cup of water for each artichoke and cooking for the specified time at highest power.

Cooking times marked between the shortest and longest cooking times are obtained by measuring a widest part (or a largest circumference) and a corresponding cooking time for each of different sizes of artichokes. The cooking times can be marked from the shortest cooking time to the longest cooking time at intervals of 1 centimeter, e.g., the cooking times, 12.5, 13, 14, 15. 16, 16.5, 17, 18, 19, 21, 23, 25, 27, 29, 30, 32, 34, 35.5, 37, 39, 41, 42, 43, 44, 44.5, 46, 47, 47.5, 48, 49, 50, 51 and 52 minutes, marked at intervals of 1 centimeter on the edge 102a. Alternately, the cooking times can be marked from the shortest cooking time to the longest cooking time at intervals of 1 inch or half inch, e.g., the cooking times, 3, 3.5, 4, 4.5, 5, 5.5, 6, 6.5, 7, 7.5, 8.5, 9, 9.5, 10, 11, 11.5, 11.75, 12, 12.75, 13, 13.5, 14 and 15 minutes, are marked at intervals of 1 inch or half inch on the edge 102b.

In this embodiment, the end portion 102c has an extra portion 104 on which the cooking time pointer 104a is marked and an extra portion 106 on which the cooking time pointer 106a is marked. Thus, the end portion 102c equipped with extra portions (104, 106) is wider than the remaining portions of the bendable ruler 102 (including the end portion 102a). A strip opening 101 may be formed on the end portion 102c of the ruler 102 through which an opposite end portion 102d of the ruler 102 can be inserted when the ruler 102 is wrapped around the artichoke body 150. The strip opening 101 is designed for easily wrapping the ruler 102 around and measuring the artichoke body 150. However, the ruler 102 can still be used to measure the artichoke body 150 without the strip opening 101.

A user guide or cook guide may be printed on a blank area of the ruler 102. A user guide or cook guide example is listed as follows:

"Take the ruler to measure around the widest part of an artichoke. Cook the artichoke for the corresponding time.

Steam/Boil—Fill a pot with approximately 3 inches of water, boil the water and place the artichoke upright in the pot. Cook the artichoke for the amount of time specified by the ruler. For best results, place the artichoke on a steam rack above the water line.

Microwave—Place the artichoke in a microwave-safe covered bowl with ¼ cup of water for each artichoke. Cook the artichoke for a specified time at highest power.

Similar cooking time measuring scales can be applied on other vegetables or fruits, e.g., potatoes, squash, broccoli, cauliflower, corn or other vegetables or fruits that have cooking times which are sensitive to their sizes. The cooking times marked on the measuring scale may include, but are not limited to, steaming times, boiling times, microwaving times or baking times. Those who are skilled in the art can measure a widest part and a corresponding cooking time for a selected vegetable or fruit of a different size, i.e., from very small ones to very large ones, and record all circumferences and matched cooking times so as to make a cooking time measuring scale. Therefore, each selected vegetable or fruit can have its own cooking time measuring scale.

According to the above-discussed embodiments, the cooking times measuring scale for artichokes or other vegetables or fruits can enable a user to properly cook an artichoke, vegetable or fruit. The user will never have to guess at cooking times again. The user just needs to wrap a handy cooking time measuring scale around a corresponding vegetable or fruit body to reveal the ideal, cooking time. This handy cooking time measuring scale addresses one of the long unmet needs in cooking vegetables or fruits.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A cooking time measuring scale comprising:
   a bendable ruler with cooking times marked at regular intervals; and
   a cooking time pointer disposed at a first end portion of the bendable ruler,
   when the bendable ruler is wrapped around a vegetable body or a fruit body with the cooking time pointer aligned with the cooking times, an ideal cooking time is measured by using the cooking time pointer to indicate a corresponding cooking time.

2. The cooking time measuring scale of claim 1, wherein the cooking times are marked at intervals of 1 centimeter.

3. The cooking time measuring scale of claim 1, wherein the cooking times are marked at intervals of 1 inch or half inch.

4. The cooking time measuring scale of claim 1, wherein the first end portion of the bendable ruler comprises an opening through which an opposite second end portion of the bendable ruler is inserted when the bendable ruler is wrapped around the vegetable body or the fruit body.

5. The cooking time measuring scale of claim 1, wherein the first end portion of the bendable ruler is wider than the remaining portions of the bendable ruler.

6. The cooking time measuring scale of claim 1, wherein the cooking times comprise steaming times, boiling times, microwaving times or baking times.

7. The cooking time measuring scale of claim 1, wherein the bendable ruler having a first edge marked with microwave cooking times at regular intervals and an opposite second edge marked with steam or boil cooking times at regular intervals.

8. The cooking time measuring scale of claim 7, wherein the first end portion of the bendable ruler comprises an opening through which an opposite second end portion of the bendable ruler is inserted when the bendable ruler is wrapped around the vegetable body or fruit body.

9. An artichoke cooking time measuring scale comprising:
   a bendable ruler with steam or boil cooking times in minutes marked at regular intervals; and
   a cooking time pointer disposed at a first end portion of the bendable ruler,
   when the bendable ruler is wrapped around an artichoke body with the cooking time pointer aligned with the steam or boil cooking times, an ideal cooking time is measured by using the cooking time pointer to indicate a corresponding steam or boil cooking time.

10. The artichoke cooking time measuring scale of claim 9, wherein a shortest steam or boil cooking time is 12.5 minutes and marked at about 4.5 inches away from the cooking time pointer.

11. The artichoke cooking time measuring scale of claim 10, wherein a longest steam or boil cooking time is 52 minutes and marked at about 20.5 inches away from the cooking time pointer.

12. The artichoke cooking time measuring scale of claim 11, wherein the steam or boil cooking times are marked from the shortest cooking time to the longest cooking time at intervals of 1 centimeter.

13. The artichoke cooking time measuring scale of claim 9, wherein the first end portion of the bendable ruler comprises an opening through which an opposite second end portion of the bendable ruler is inserted when the bendable ruler is wrapped around the artichoke body.

14. The artichoke cooking time measuring scale of claim 9, wherein the first end portion of the bendable ruler is wider than the remaining portions of the bendable ruler.

15. An artichoke cooking time measuring scale comprising:
   a bendable ruler with microwave cooking times in minutes marked at regular intervals; and
   a cooking time pointer disposed at a first end portion of the bendable ruler,
   when the bendable ruler is wrapped around an artichoke body with the cooking time pointer aligned with the microwave cooking times, an ideal cooking time is measured by using the cooking time pointer to indicate a corresponding microwave cooking time.

16. The artichoke cooking time measuring scale of claim 15, wherein a shortest microwave cooking time is 3 minutes and marked at about 4.5 inches away from the cooking time pointer.

17. The artichoke cooking time measuring scale of claim 16, wherein a longest microwave cooking time is 15 minutes and marked at about 20.5 inches away from the cooking time pointer.

18. The artichoke cooking time measuring scale of claim 17, wherein the microwave cooking times are marked from the shortest cooking time to the longest cooking time at intervals of 1 inch or half inch.

19. The artichoke cooking time measuring scale of claim 15, wherein the first end portion of the bendable ruler comprises an opening through which an opposite second end portion of the bendable ruler is inserted when the bendable ruler is wrapped around the artichoke body.

20. The artichoke cooking time measuring scale of claim 15, wherein the first end portion of the bendable ruler is wider than the remaining portions of the bendable ruler.

* * * * *